Oct. 19, 1965 R. W. VREELAND ETAL 3,212,229
FILM PACKAGING ARRANGEMENT
Filed Sept. 28, 1962 4 Sheets-Sheet 2
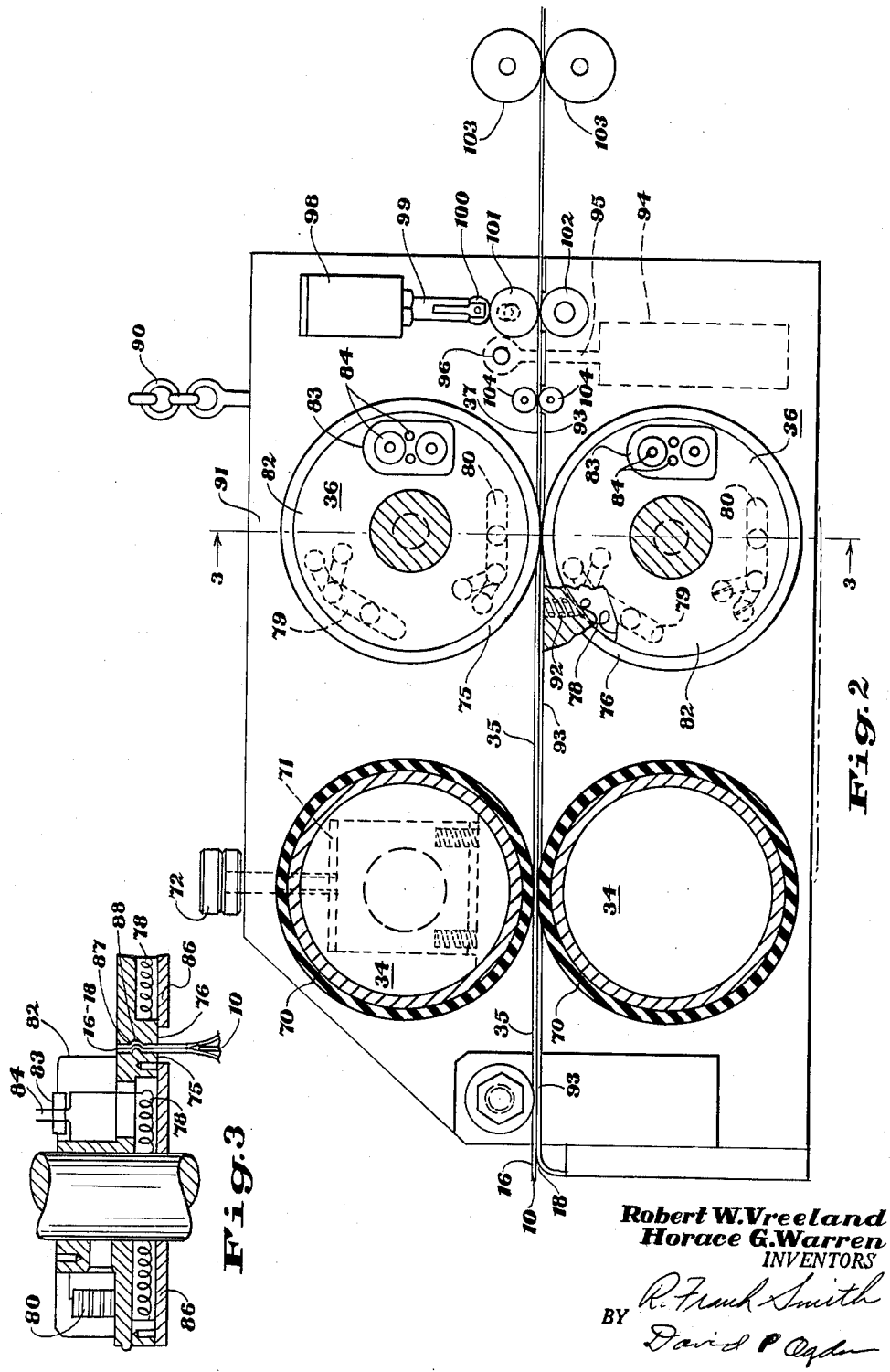
Robert W. Vreeland
Horace G. Warren
INVENTORS
BY R. Frank Smith
David P. Ogden
ATTORNEYS

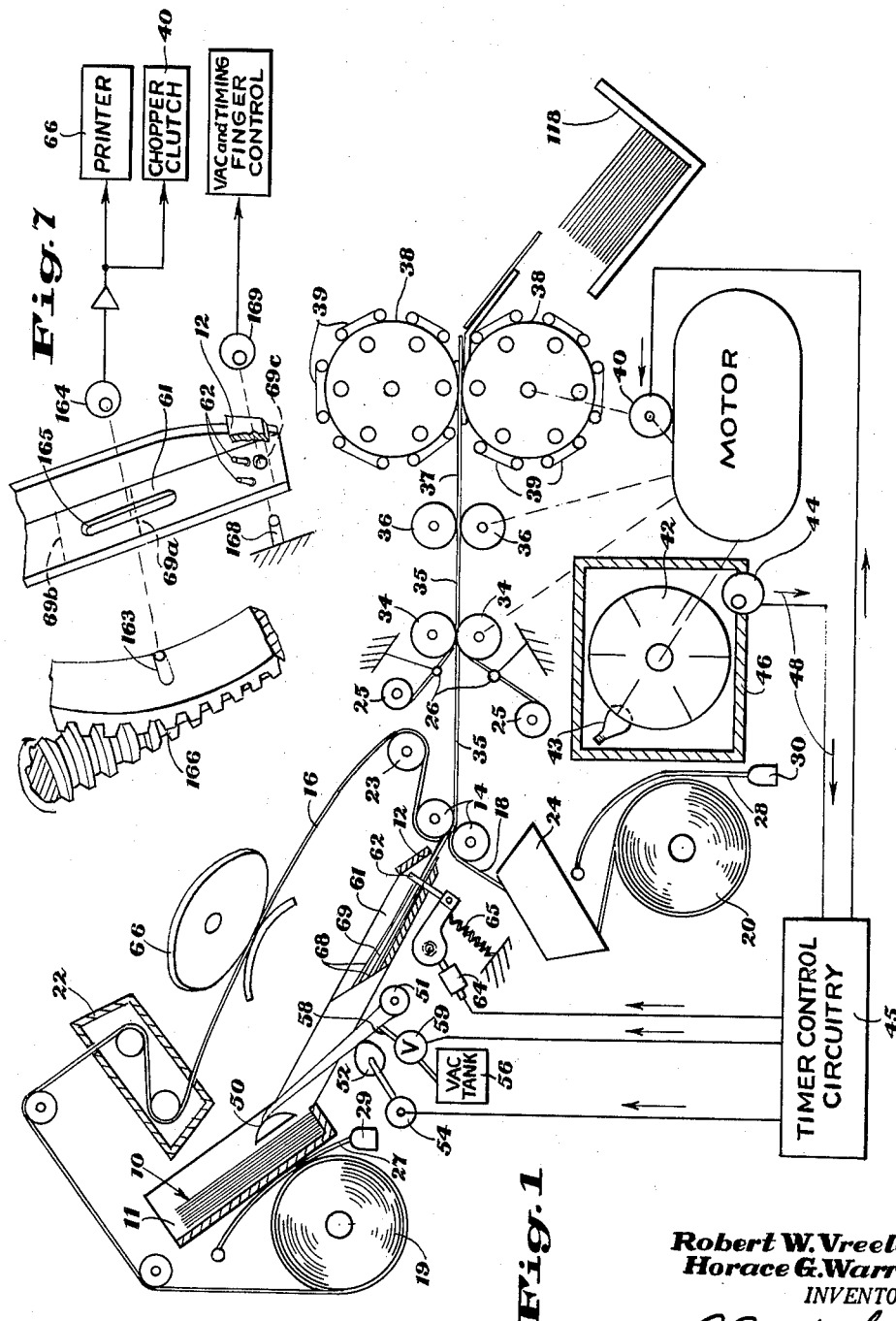
Robert W. Vreeland
Horace G. Warren
INVENTORS

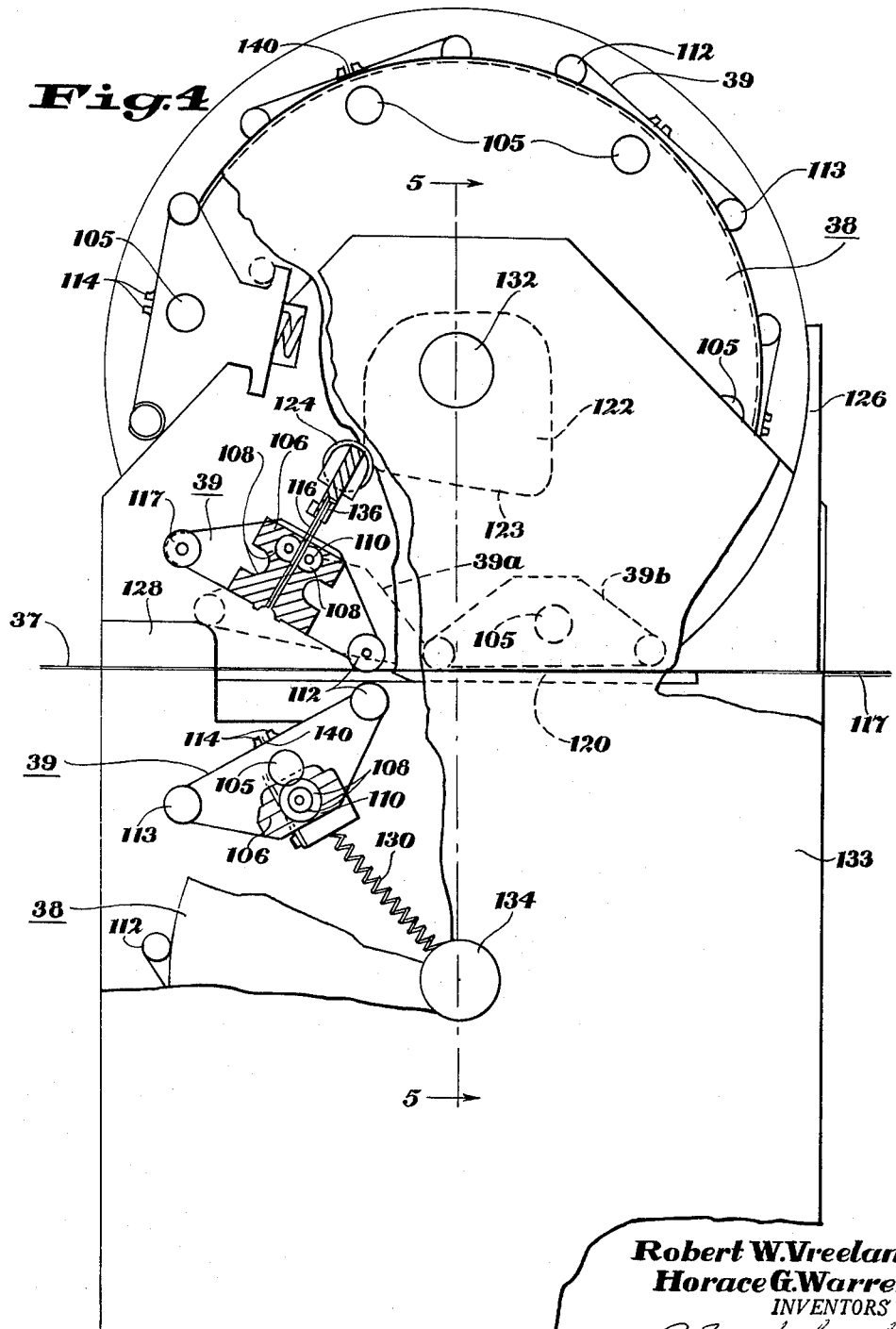

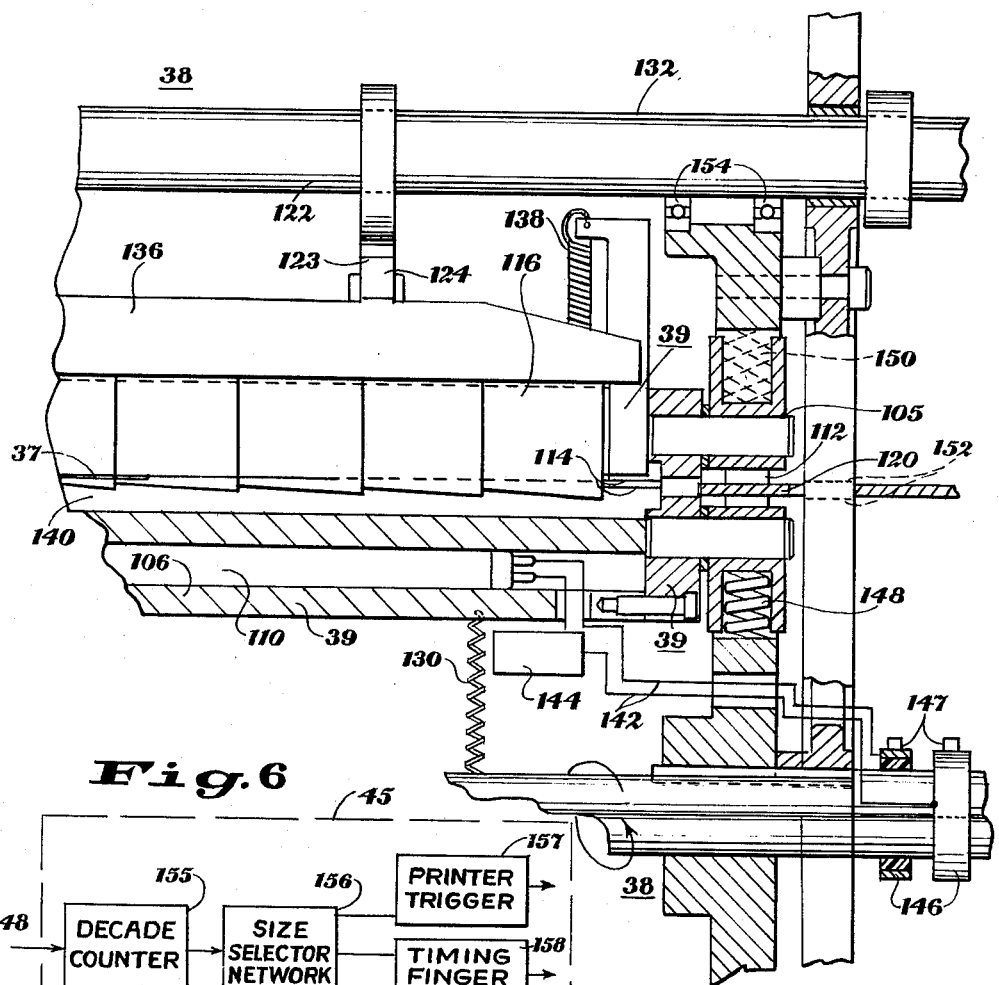
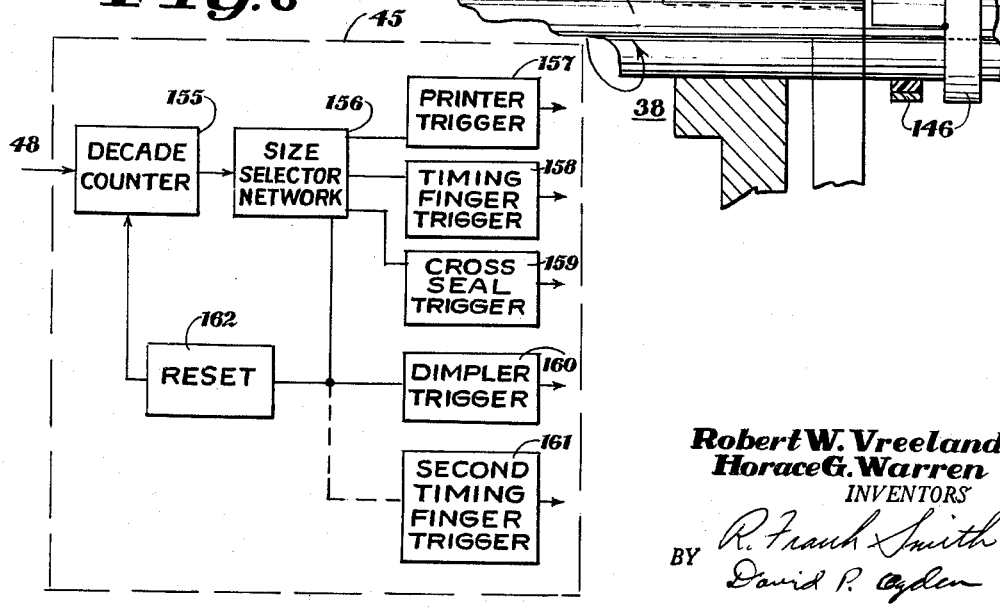

United States Patent Office 3,212,229
Patented Oct. 19, 1965

3,212,229
FILM PACKAGING ARRANGEMENT
Robert W. Vreeland and Horace G. Warren, Rochester, N.Y., assignors to Eastman Kodak Company, Rochester, N.Y., a corporation of New Jersey
Filed Sept. 28, 1962, Ser. No. 227,016
11 Claims. (Cl. 53—182)

This invention relates to a packaging arrangement and, more particularly, to a device and method for packaging preselected sizes of X-ray film material.

Packaging of film by hand methods has not proved to be economically competitive, especially in view of the fact that many films are pressure sensitive and must be packaged in a dark environment. Packaging of X-ray film is particularly troublesome because X-ray film is produced in several standard sizes with relatively small runs of each size being most practicable. With several sizes required for various uses, the provision of a high-speed automatic machine designed specifically for packaging each of the standard sizes is not most practicable.

Therefore, an object of the present invention is to provide a reliable film packaging arrangement which completely encloses each film sheet in separate packages and which is easily controllable to allow the packaging of the various sizes of X-ray film being marketed.

One embodiment of the present invention comprises a feed mechanism arranged to present individual spaced-apart X-ray film sheet packets to the packaging arrangement and means arranged to present both upper and lower aligned envelope layers of opaque webbing to the packaging arrangement. The opaque envelope layers have mating surfaces coated with a heat-sealable material such as polyvinylacetate and are presented to the packaging arrangement as endless strips through lateral positioning aligners. With the spaced-apart film sheet packets between the wrapper webs, the edges of the webs are sealed by heated rollers, and a synchronized sealer and chopper operates selectively to separate the film packages into completely sealed units.

The subject matter which we regard as our invention is particularly pointed out and distinctly claimed in the concluding portion of this specification. The invention, however, as to its organization and method of operation, together with further objects and advantages thereof, will best be understood by reference to the following detailed description taken in connection with the accompanying drawings, in which:

FIG. 1 is a schematic side plan view of the film packaging arrangement according to our invention;

FIG. 2 is a detailed view partially in section of the side sealer arrangement;

FIG. 3 is a fragmentary cross-sectional view of one side sealer taken along the line of 3—3 of FIG. 2;

FIG. 4 is a plan view partially in section of the chopper mechanism;

FIG. 5 is a cross-sectional view taken along the line 5—5 of FIG. 4;

FIG. 6 is a block diagram of one control circuitry arrangement; and

FIG. 7 is a schematic diagram of another timing control means.

Referring now to the drawings, wherein like numbers refer to similar parts, in FIG. 1 we have shown a supply of sheet film packets 10 within a storage receptacle 11 and arranged to be presented through a feeder slot 12 to a pair of guide rollers 14 at preselected intervals. The guide rollers 14 also receive a top surface wrapper web 16 and a bottom surface wrapper web 18 from material supply rolls 19 and 20 respectively. The rolls 19 and 20 initially contain a thousand feet or more of wrapper web such as black latex coated yellow kraft paper with their ends being spliced to additional rolls as needed. The alignment of the upper wrapper web 16 is regulated by an aligner 22, of the type which is commercially available, and a guide roller 23, having adjustable flanged end portions which guide the wrapper web 16 toward the rollers 14. The wrapper web 18 is provided with a similar aligner 24.

We have also provided a pair of rip strip supply rolls 25 which are used when the packaged specification requires a rip strip along an edge of the finished film package. Usually, we prefer to provide a guide arrangement such as a pair of eyelets 26 to assure location of the ¼″ Mylar tape rip strip along the desired edge.

In order to prevent backlash or slack wrinkles in either of the wrapper webs, a prescheduled tension is maintained in the wrapper webs 16 and 18 by the friction of the feeder systems which carry the webs to the film packaging arrangement and by the addition of weighted canvas straps 27 and 28, which engage the outermost surface of the supply rolls 19 and 20. The weights 29 and 30, secured to the canvas straps 27 and 28 respectively, are selected so that the film packaging arrangement may be shut down suddenly without serious backlash problems.

The feeding of the wrapper webs 16 and 18 is assured by passing the webs between a pair of high surface-friction drive rollers 34, which frictionally engage the outer surfaces of the composite web 35 and present it to edge sealers 36, which are heated and tightly engage only the edges of the webbing to seal continuously the edges and provide a flat tube 37 containing the spaced-apart sheet film packets. The flat tube 37 proceeds from the edge sealers 36 to a cross seal chopper station comprising a pair of support wheels 38, each of which supports six heated clamp means 39, having chopper or cutoff means whereby the flat tube 37 is laterally sealed in regions lying between the sheet film packets and cut in the middle of the lateral or cross seal region. The resulting package is provided a seal at a leading and a trailing edge with respect to each film packet as it is separated into individual packages. The support wheels 38 are intermittently driven by a selectively operated positive drive clutch 40. The support wheels 38, the edge sealers 36, and the drive rollers 34 are driven by a single constant speed motor 41 or by synchronized motors.

In accordance with one timing control means, a position counter in the form of a light chopper wheel 42 provides, by means of a light 43 and a photoelectric detector 44, a plurality such as six digital signals per revolution thereof to the timer control circuitry 45 of the present invention. Because of the light sensitivity of the film, the light 43, etc., must be infrared or entirely enclosed within a light-proof housing 46. In view of the fact that a usual speed of a synchronous driving motor is 1,750 r.p.m., 10,500 digital signals per minute will be provided to the timer control circuitry 45. As will be explained in greater detail below, these signals 48 will initiate synchronous control of all sequentially operable components of our packaging arrangement.

Since X-ray film is pressure sensitive, it must be handled carefully to prevent erroneous pressure images on the finished plate. Therefore, the feed mechanism includes a controlled vacuum suction cup 50 pivotally supported from a fulcrum 51 so that it may sequentially engage each sheet film packet 10 in response to the rotation of a cam 52 driven by a cam drive motor 54. The vacuum of the cup 50 is supplied by a vacuum tank 56 coupled thereto through a tube 58 having a three-way valve 59 therein. When the vacuum cup 50 is about to engage the sheet film packet 10, the valve 59 is operated to create a vacuum sufficient to hold the film packet securely. As the cam 52 rotates further, the vacuum cup 50 is raised to a standby position whereby release of the vacuum will drop the film packet into a chute 61 to be intermittently detained by timing fingers 62.

The timing fingers 62 are selectively retracted in response to the de-energization of a solenoid 64 by a tension spring 65. The retracting of the timing fingers 62 determines the precise location of the leading edge of the sheet film packet 10 in the flat tube 37. Also, the valve 59 is interlocked so that the vacuum will not be released to submit another sheet film packet 10 until the timing fingers 62 are again extended to detain it. The drop time from the timing fingers 62 to the symetrically positioned guide rollers 14 is usually determined empirically before establishing all of the timing of the interdependent sequential operation discussed below.

In one embodiment of our invention, the cam drive motor 54, the valve 59, and the solenoid 64 are all controlled by signals from the control circuitry 45. Also under the control of this timing means is an envelope printer 66, which codes or otherwise marks the outer surface of the top wrapper web 16. The wrapper web 18 may be arranged to have a similar printer place additional information or the same information in another language on the lower web surface.

Because of the various problems in handling X-ray film, the supply of sheet film packets 10 is, in fact, comprised of a soft black paper folder 68 within which rests each film sheet 69. In order that the folders 68 may be picked up rapidly without loss of the film sheet 69, the suction cup 50 engages the upper surface of the folder 68 near its leading, folded edge.

The providing of the continuously moving composite web 35 is accomplished after the webs 16 and 18 are threaded through the guide rollers 14 to the rubber drive rollers 34, and the printer 66 is prepared with the proper coding. With the control circuitry 45 arranged to operate the film packaging arrangement components in a preselected timed relationship for the particular size film being packaged, the suction cup 50 engages the initial supply of the film packets 10, picks up a first sheet and drops it against the extended timing fingers 62. The suction cup 50 then drops and picks up a second film envelope 68 and holds it ready to submit it to the chute 61. The timing fingers 62 are retracted at a predetermined instant by a signal from the control circuitry 45, dropping the film 69 and the folder 68, toward the guide rollers 14 to place it within the composite web 35 in a predetermined location.

The guide rollers 14 are arranged so that the folder 68 engages symmetrical web surfaces. If the rollers 14 were vertical in the machine, as are the rollers 34 and 36, the film folder 68 would approach these rollers at an angle tending to result in inaccurate positioning of the film and sometimes in folding or other damage to the film sheet 69. By skewing the pair of guide rollers 14 relative to the vertical position of the machine and placing their axes in a plane perpendicular to the line of motion of the film folder 68 as it passes through the slot 12, this problem is avoided. We prefer that the rollers have relatively soft resilient surfaces to grasp the film between the superposed upper and lower webs 16 and 18 in a central location thereof. Depending on the length of the film packets 10, a second, third or fourth sheet have been placed in a spaced-apart relation between the upper and lower webs by the time the first sheet is sealed and chopped.

Referring now to FIG. 2, the rubber surface drive rollers 34 operate much like washing machine wringer rollers, wherein an outer rubber surface 70 engages the composite web 35 and presents it to the edge sealers 36. The pressure between the rubber drive rollers may be regulated by any conventional arrangement. As illustrated in dashed lines, the spring-loaded end blocks 71 of the top roller are driven toward the lower by means of a bolt and lock-nut arrangement 72.

The edge sealer, as shown in FIGS. 2 and 3, comprises a pair of heated mating flanges 75 and 76, which engage the edge of the composite web 35 at a point removed from the centered sheet film packet 10. Each of the flanges 75 and 76 is heated by a thermostatically controlled heater element 78 with the temperature-sensitive switches 79 and 80, of the type used in sad irons, controlling the low limit shut down and the maximum permissionable temperature limit respectively. Thus, the switch 80 is serially connected in the heater line, and the switch 79 is a safety switch coupled to the emergency shut down switch (not shown).

In order that sparking light flashes of the switches 79 and 80 do not damage the film being processed, an opaque cap 82 (FIG. 3) is placed thereover and defines an aperture 83 suitable for egress of the various wires 84 in the circuit. A similar cover plate 86 is placed over the heater unit 78 itself. The mating flanges 75 and 76 are also provided with at least one mating annular ridge 87 and groove 88 to improve their grip and heat transfer characteristics to assure a light-tight seal.

In order that the machine may be adjusted to handle webbing stock of various widths in accordance with the several film sizes being packaged, the lateral position of one pair of the edge sealing rollers 36 is made adjustable, whereby the pair of rollers on one side of the machine may be moved in or out to provide the desired spacing between the edge-sealing locations. Usually, it is preferred that this be accomplished by a rectangular screw thread arrangement (not shown) much like that used in a conventional work bench vise.

The rollers 34 and 36 are both driven by the drive motor 41, which energizes the light chopper wheel 42 (FIG. 1) with the rollers 34 controlling the velocity of the web through the packaging arrangement. The sealing flange surfaces 75 and 76 move at a slightly higher speed than the drive roller surfaces 70 and tend to keep the webbing flat and under tension as it leaves the drive rollers 34.

In order to simplify startup and shut down of the system, the top rollers (34 and 36) may be lifted from the lower rollers to provide a substantial gap and allow threading of webbing through the system. In such event as it is necessary to shut the system down, tension is applied to a chain 90 to lift a top journal member 91. At the same time, a spring 92 lifts a bed plate 93 and the composite web 35 thereon from the heated flange 76 to prevent heat damage to the film and to the flat tube 37 containing the film. When our packing arrangement is operating, the top journal member 91 is also under the control of an air cylinder arrangement shown in dashed lines at 94 with air pressure being applied to operate a plunger 95, which engages a bolt 96 to raise and lower the top journal member 91 as necessary.

We have also provided a thickness detector arrangement 98 having a plunger 99, the vertical position of which will indicate whether one, two, or no X-ray films are in each individual package. An output signal of the detector arrangement 98 is used to code or automatically reject packages having a wrong thickness. The plunger 99 is coupled through a cam follower 100, an idler roller 101, and the flat tube 37 to a fixed roller 102. As the sealed flat tube 37 passes between the rollers 101 and 102, it controls the spacing therebetween and the position of the plunger 99.

Because there is a tendency, from time to time, for the webbing and other materials of the system to wrinkle or jam when the composite web 35 is pushed through the edge sealers 36, we have also provided a pair of drive rollers 103 for pulling the webbing from the sealers and through the thickness detector 98. These drive rollers 103 are driven at a speed slightly higher than the speed of the drive rollers 34 but are driven by a "soft" magnetic clutch, whereby they maintain a light tension on the webbing but cannot pull it faster than it is driven through the drive rollers 34. We sometimes refer to this as a "tendency drive" because it tends to drive the webbing but, in fact, does not. Moreover, the drive rollers 103 serve an additional function in compressing the flat tube 37 to eliminate or purge substantially all of the air from the finished product prior to the cross-sealing operation.

As the flat tube 37 leaves the edge sealer 36, it proceeds through a dimpler 104, which codes the film in a manner allowing a darkroom operator to know the size film, which side is to be exposed, etc. The dimpler 104 simply impresses on a remote portion of the film package an impression code of dots.

It should be noted that the rip strip material from the rolls 25 will be secured at one edge location, either by the drive rollers 34 or the edge sealers 36, in accordance with the type of adhesive used. Once the webbing has been sealed at its edges and the film has been coded, the remaining steps include cross sealing the end portions, separating the individual packages longitudinally, and boxing them in preparation for shipment.

Referring now to FIG. 4, we have shown a unique selectively operable arrangement for sealing the ends of the package and separating the packages. The support wheels 38 support a plurality of heatable clamp means 39 on rotary supports 105 and are selectively drivable to engage the flat tube 37 at preselected intervals to cross seal only between the individual sheet film packets. The clamp means 39 comprise a main body portion 106, defining a heater cavity 108 therethrough. A heating means of about 500 or 1,000 watts such as a calrod or chromalox unit 110 is placed within the cavity 108 to heat the clamp body portion 106. The clamp means 39 are also provided with leading guide rollers 112 and trailing rollers 113. These rollers engage various guide means about the periphery of the support wheels 38 to control the position of the clamp means 39. Each of the clamp means 39 is provided with a pair of heated clamping surfaces 114, and the support wheels 38 are positively coupled by gearing so that the clamping surfaces 114 move in a predetermined mating relationship. Thus, the heated clamping surfaces 114 engage opposite sides of the flat tube 37 at the same instant and for equal duration. Alternately, only one of the set of clamping surfaces 114 need be heated when the duration of the mating contact is of sufficient magnitude.

In order that the end-sealing or cross-sealing and chopping operation may be accomplished by our film package arrangement, the upper support wheel 38 is also provided with a cross chopper means in the form of a chopper blade 116 arranged within a central cavity of the clamp means 39 and operable to sever the flat tube into individual packages 117 during the passage of the flat tube 37 between the heated clamping surfaces 114. These complete individual packages 117 are then dropped into a container 118 (FIG. 1).

The operation of the support wheels 38 is controlled by a signal from the timer control circuitry 45, which sequentially initiates energization of these wheels to seal and separate individual packages 117 of different sizes in accordance with the movement of the film sheet packets into the guide rollers 14 (FIG. 1). When a signal initiates motion of the support whels 38, one pair (upper and lower) of the clamp means 39 proceeds from the standby position indicated in solid lines to the position 39a indicated in dashed lines being guided by its leading guide rollers 112 which follow a guide 120. As a result of this guided coacting movement, the heated clamp surfaces 114, both upper and lower, engage the flat tube 37 for some distance each side of the center line of the end-sealing and chopping system. Such continued engagement, as indicated by the dashed lines 39b, assures a complete pair of cross seals of each of the packages 117 without stopping the continuous movement of the flat tube 37.

In order to operate the chopper blade 116, the upper support wheel 38 has along its axis a plurality of cams, as indicated by the dashed lines at 122. A lower cam surface 123 is biased to operate the chopper blade 116 downward to separate the sealed packages 117 by drivingly engaging a cam follower 124. Thus, as the upper support wheel 38 rotates, the cutter blade 116 is driven between the heated surfaces 114 to completely sever the individual packages 117 within the region of the cross seals.

Because of the balance within the upper support wheel of the clamp means 39 about their rotary support 105, they will sometimes tend to tip over so that the guide rollers 112 will not be in a position to properly engage the guide 120. Prevention of this is accomplished by the addition of a pickup guide 126 in the output region of cross seal station. Also, because of the cam 122, the cam follower 124 has a tendency to drop under the surface 123 before the guide roller 112 engages the guide surface 120. Such operation is prevented by the addition of a lead-in guide surface member 128, which forces the guide roller 112 to move inwards sufficiently to assure that the cam follower 124 remains behind the surface 123 until the clamp means 39 is in the position 39a.

Because of the omission of the cutting blade 116, the arrangement of the lower support wheel 38 is somewhat simpler, and the proper positioning of the clamp means 39 is established by a tensioned spring 130. Since the cam 122 must be nonrotatably supported near the axis of the upper support wheel 38, the upper central shaft 132 is nonrotatable with respect to each end surface of the bearing plate 133. Instead of being drivingly coupled to each other, each of the upper support wheel end portions are gear driven from their mating lower support wheel counterparts. On the other hand, since the spring 130 must rotate with the clamps 39, the lower shaft 134 rotates with the lower support wheel 38. Because of the relatively heavy work load of the system, we prefer that all of the cam followers discussed above be of the needle-bearing type.

As illustrated, each support wheel 38 symmetrically supports six clamp means 39 with the longitudinal spacing therebetween being small enough to efficiently sever individual packages suitable to contain the small size X-ray film in production. However, since these support wheels 38 are intermittently driven, they may also be used to sever individual packages 117 of a substantially larger size.

Referring now to FIG. 5, we have shown a cross-sectional view of the central section of the pair of support wheels 38, wherein the cam-driven arrangement is shown in solid lines with the cam 122 being nonrotatably secured to the nonrotatable shaft 132. As illustrated, the cutter blade 116 is, in fact, a plurality of similar cutter blades, whereby the reactive force created by the cutting operation is distributed throughout the length of a blade support bar 136, which is biased toward the retracted position by spring means 138. As is indicated in FIG. 4 and clearly illustrated in FIG. 5, during the cutting operation, the cutter blade 116 partially enters a slot 140 provided in the body portion 106 of the lower clamp means 39.

In addition to the power leads 142, the circuitry of the heating unit 110 includes a temperature-controlling thermal switch 144 and a pair of electrically insulated slip rings 146, which receive energy through a pair of brushes 147. Positive engagement between the guide 120 and the guide rollers 112 and 113. (FIG. 4) of the lower clamp means 39 is assured by a high-strength compression spring 148 in the region of the journal 105 of the lower clamp means 39. The upper clamp means is provided with a somewhat softer compression spring 150 to assure proper engagement of the upper heated surfaces 114 and the chopper blade 116 against the flat tube 37. Also illustrated in FIG. 5 is the positive gear driving connection of the end gears 152 and a ball-bearing journal support 154 of the upper support wheel 38. As is indicated in the above discussion, timed sequential control of the cross seal and chopper operation is requisite to the present invention.

One timing control means for sequentially operating our film packaging arrangement is illustrated diagrammatically in FIG. 6, wherein the light chopper wheel signals 48 are applied to the timer control circuitry 45, which includes a three-decade counter 155, at a rate of 10,500 per minute. As is well known in the electronics art, a three-decade counter has a work cycle of 1,000 pulse receipts before becoming saturated. Thus, our film packaging arrangement is set up to accomplish a complete package within 1,000 signal pulses. Such a relationship is easily established by controlling the surface speed of the drive rollers 34 compared to the radial speed of the light chopper wheel 42. For instance, moving the web .02 inch per count will allow packages as long as 20 inches. These counts are developed as the signals 48 are applied to the three-decade counter 155 and are from there applied to a programming means in the form of a size selector network 156. The size selector network includes an arrangement which is effectively a ganged selector switch resulting in the utilization of preselected counts to establish the sequential operation necessary by providing timing pulses to a plurality of trigger pulse circuits.

One of these circuits, a trigger printer circuit 157, provides a pulse synchronized so that the printer 66 will encode the top surface wrapper web 16. When an envelope printer is also provided for the bottom surface wrapper web 18, it will be similarly triggered.

A timing finger trigger circuit 158 terminates a signal to the solenoid 64 to withdraw the fingers 62 and drop each film sheet through the feeder slot 12. As soon as the sheet film packet 10 has cleared the region of the timing fingers 62, this condition is sensed. As discussed below, the vacuum is released from the cup, whereby the next sheet film packet is dropped, and the fingers 62 are raised to detain it. As soon as the new sheet film packet 10 reaches the region of the fingers 62, the cam drive motor 54 is energized, whereby another sheet film packet is quickly positioned for dropping against the timing fingers 62.

On another count, a cross-seal trigger circuit 159 energizes the positive drive clutch 40 to rotate the support wheels 38 60° and provide one cross seal and one cut across the flat tube 37. A dimpler trigger circuit 160 energizes the dimpler 104 to encode the film package.

Alternately to the above operation, wherein the vacancy of the chute in the region of the timing fingers 62 is controlled by the timer control circuitry 45 directly, the size selector network 156 may provide a signal through a second timing finger trigger 161 to raise the timing fingers 62, release the vacuum by operating the valve 59, and initiate operation of the cam drive motor 54 to pick up an additional sheet. The size selector network 156 also energizes a reset trigger circuit 162 to restart the cycle by resetting the counter 155 to zero.

It will be recognized, since there is a substantial length of surface webbing between the printer 66 and the clamp means 39, the timing of these various operations may be sequentially changed. Thus, the printer circuit 66 may operate slightly before retracting the timing fingers 62 for a small size sheet film 69 and may be initiated after the timing fingers 62 have been retracted for a larger size sheet film. Similarly, the support wheels 38 may be rotating at the same instant the timing fingers 62 are retracted or may be operating at another time, depending on the size of the sheet film being packaged.

Referring now to FIG. 7, we have shown another timing control means wherein a signal light 163, such as an infrared light which will not damage the film, energizes a photoelectrice detector 164 whenever a film sheet and folder packet traverse the region of a slot 165 through which the light is directed to detect the trailing edge, indicated by the phantom line 69a, of a film packet 10. When the timing fingers 62 are extended, the detained film packet would have a trailing edge, as indicated by the phantom line 69b. When the photo cell 164 is energized, it provides a trigger pulse to the printer 66 and to the chopper drive clutch 40 (FIG. 1). Because of the fact that our invention is arranged to package a plurality of different sizes of X-ray film, the position at which the trailing edge 69a must be detected will vary. A longitudinal adjustment of the detector is preferred to provide an integral number of package distances from the chopper blades to the trailing edge 69a. Thus, the slot 165 is elongated, and the light 163 is adjustable by some means such as a worm-gear drive 166 to detect the trailing edge 69a throughout a range of distances during its travel down the chute 61.

A similar light 168 and photo cell 169 detect clearance of the timing fingers 62 by the trailing edge of the packet 10, as indicated by a phantom line 69c. This signal is applied to the vacuum release valve 59 (FIG. 1) and to a cam drive motor 54 for raising the timing fingers 62. As illustrated, the detecting arrangement 168–169 is downstream of the timing fingers 62. However, the detection may be accomplished a short distance above the timing fingers 62 without departing from the parameters of the present invention.

In view of the fact that the longitudinal detecting slot 165 may not be as long as the longest of the sheet films being processed, it may be expected that the distance from the detection point 69a may not always be adjusted to detect integral package lengths from the chopper blades 116. When this situation is present, the programming means is adjusted to remedy it by providing an offset idler (not shown) along the path of the composite web 35 or by moving the tendency drive rollers 103 vertically to increase the distance and thus provide a precisely known distance between the chopper blades 116 and the detector 163–164. Similarly, the printer 66 (FIG. 1) is mounted so that its position may be adjusted longitudinally, whereby the coding signal on the finished package will be properly centered.

While we have shown and described particular embodiments of the present invention, other modifications may occur to those skilled in this art. For instance, the film packaging arrangement is usable to provide a two-size mixed run by simply providing two trigger signals from each operating trigger circuit (FIG. 6) or by using two spaced-apart signal lights 163 (FIG. 7) A more complex mix run may be accomplished by our invention by similar modifications of the timing control means. Moreover, our packaging arrangement may be used with pressure-sensitive tape, whereby the heating elements 78 and 110 may be omitted. However, when using pressure sensitive mating of the wrapper webs and soft finish kraft wrapper paper, sacrifice tape in provided on each of the wrapper webs 16 and 18. We wish it to be understood that the appended claims are intended to include all modifications which come within the true spirit and scope of the present invention.

We claim:
1. A sheet film packing arrangement comprising:
   a pair of drive rollers drivable at a constant speed;
   means for continuously supplying two aligned strips of opaque surface wrapper webbing to said pair of drive rollers;
   means for determining the drive rollers tangential velocity and providing a signal for each unit distance traveled by said strips;
   a timing control means receptive of said signals;
   means for placing between said mating surfaces longitudinally spaced-apart sheets of the light-sensitive film with the location of the trailing edges of each sheet being precisely controllable in accordance with the operation of said timing control means;
   an intermittently operable end sealer and chopper arranged to operate only in response to signals from said timing control means so that a cross seal is provided between each sheet of film, and the sheets are separated within the cross seal, whereby each leading and trailing edge of the resulting individual packages is secured; and size-selector operable to control said end sealer and chopper to cross seal and chop between the film sheets and being operable to program the cross-sealing operation for a plurality of film sheet sizes.

2. A sheet film packaging arrangement as in claim 1 wherein there are provided edge sealing means between said placing means and said end sealer and chopper to provide a tube formed of the wrapper webbing and containing the spaced-apart sheets.

3. A sheet film packaging arrangement as in claim 2 wherein there is provided a pair of rollers between said edge sealing means and said end sealer and chopper to engage and compress the tube to thus purge air therefrom.

4. A sheet film packaging arrangement comprising:
  roller transport means drivable to transport a pair of aligned opaque wrapper webs at a predetermined velocity;
  control means responsive to said velocity for developing signal information;
  feeder means responsive to the signal information for placing spaced-apart packets in said roller transport means between the webs; and
  an intermittently operable end sealer responsive to the signal information to seal the webs in the space between the packets.

5. A sheet film packaging arrangement as in claim 4 wherein said feeder means presents each packet to an initial pair of rollers of said transport means with the spacing thereof relative to said end sealer being determined during the operation of said feeder means so that the seal will be made only in spaces between the packets.

6. A sheet film packaging arrangement comprising:
  a roller transport system including pairs of rollers having mating surfaces;
  means for continuously supplying two aligned strips of opaque surface wrapper webbing to the first pair of rollers;
  film feeding means for placing between the mating surfaces of the webbing longitudinally spaced-apart packets of the light-sensitive sheet film at an angle such that they enter between said first pair, said film feeding means being spaced from said first pair less than a packet length so that the packets leave at said constant speed;
  means for detecting the location of the trailing edges of each packet leaving said film feeding means at said constant speed with the detection resulting in a control signal;
  an intermittently operable cross sealer arranged to operate only in response to said control signal so that a cross seal is provided between each packet of film to form individual film packages;
  means for changing the point of detection of said trailing edges so that the packaging arrangement will seal film packets of substantially different sizes; and
  chopper means operable to separate the packages within the cross seal, whereby each leading and trailing edge of the separated package is sealed.

7. A continually operable film packaging arrangement for sealing a preselected size of sheet film packets in individual opaque packages comprising:
  continuously operable driving means;
  means for laterally aligning a pair of opaque wrapper webs in the region of said driving means, the webs having mating surfaces arranged to be integrally sealed together;
  feeding means for selectively placing individual film sheet packets in a longitudinally spaced-apart relation between the wrapper webs prior to engagement thereof by said driving means;
  means for sealing said mating surfaces to provide a seal therebetween around the entire periphery of the packets;
  selectively operable chopper means for separating the wrapper web within the region of each transverse seal, thereby providing a transverse seal immediately forward of the cut and immediately rearward of the cut; and
  timing control means for determining the location of the region longitudinally between the spaced-apart film sheet packets in accordance with the operation of said feeding means and being controllingly coupled to said chopper means to chop the wrapper webs only between the packets.

8. A sheet film packaging arrangement receptive of continuously moving superposed opaque wrapper webs with longitudinally spaced-apart film sheet packets therebetween, comprising:
  a pair of guide rollers drivable at a constant speed, said pair having their axes in an oblique plane;
  a gravity feed system for controllably presenting film packets to said pair with the packets dropping in a plane perpendicular to said oblique plane and passing between the tangential surfaces of said pair so that time between release of a packet and its entrance of said oblique plane is precisely determinable;
  means for determining the location of the trailing edges of each sheet moving at said constant speed with the determination resulting in a control signal;
  an intermittently operable cross sealer arranged to operate only in response to said control signal so that a pair of cross seals are provided between each packet of film to form film pockets; and
  chopper means coacting with said cross sealer and operable to separate said film pockets longitudinally between the pair of cross seals.

9. A film packaging arrangement operable continuously for extended periods for sealing a preselected size of sheet film packets in a continuous web and chopping the web in individual opaque film-containing packages comprising:
  a pair of selectively operable support wheels;
  a plurality of chopper blades drivingly supported on the periphery of said wheels for separating the continuous web into individiual film-containing packages;
  means for conveying a pair of superposed opaque wrapper webs to said wheels, the webs having mating surfaces arranged to be integrally heat sealed together;
  feeding means for selectively placing film packets between the webs prior to region of said wheels so that an unfilled region is provided between film packets;
  heatable sealing means for edge sealing said mating surfaces to provide a flat tube containing the spaced-apart film packets;
  heatable clamping surfaces supported by said wheels and coacting with said chopper blade to cross seal the flat tube each side of said chopper blade; and
  timing control means for developing signal information in accordance with the operation of said feeding means to establish the location longitudinally of the unfilled region and being controllingly coupled to said wheels to cause the engagement of said clamping surfaces and one of said chopper blades, suquentially only within said unfilled region.

10. A film packaging arrangement operable continuously for extended periods for sealing a preselected size of sheet film packets in a continuous web and chopping the web into individual opaque film-containing packages comprising:
  a pair of selectively operable support wheels;

a plurality of chopper blades drivingly supported by one of said wheels in a spaced relation around the periphery thereof with the spaced relation being less than a packet link;

a nonrotatable cam surface arranged to coact with said one wheel;

a cam follower co-operating with said cam surface for radially driving one of said chopper blades during rotation of said one wheel to separate the continuous web into individual film-containing packages;

means for conveying a pair of superposed opaque wrapper webs to said wheels, the webs having mating surfaces arranged to be integrally heat sealed together;

feeding means for selectively placing film packets between the webs prior to region of said wheels so that an unfilled region is provided between film packets;

heatable edge-sealing means for continuously edge sealing said mating surfaces to provide a flat tube containing the spaced-apart film packets;

means for maintaining the edge-sealing means at a preselected elevated temperature;

clamp means defining longitudinally adjacent heatable clamping surfaces supported by said wheels and coacting with said chopper blade to cross seal the flat tube each side of said chopper blades respectively;

cam positioning means for maintaining contact between said clamping surfaces and the flat tube for a substantial portion of the rotation of said wheels; and timing control means for determining the location of the unfilled region longitudinally and being controllingly coupled to said wheels to cause the engagement of said clamping surfaces and said chopper blades respectively only within each of said unfilled regions.

11. A sheet film packaging arrangement receptive of continuously moving superposed opaque wrapper webs with spaced-apart sheet film packets therebetween, the wrapper webs having heat-sealable mating surfaces, the packaging arrangement comprising:

a pair of drive rollers for driving the wrapper webs at a constant speed;

edge sealers operable at a constant speed to integrally join the mating edges of the wrapper webs to form a flat tube;

means for determining the location of the unfilled region between each successive sheet film packet as it is presented between the webs with the determination resulting in a control signal indicative of the packet size;

roller means for purging air from the flat tube;

a pair of support wheels rotatable only in response to the control signal to cross seal and separate film packages;

cross sealers mounted on said support wheels and drivable thereby to engage the flat tube so that a pair of adjacent cross seals are provided between each of the packets to form film pockets; and a plurality of chopper blades sequentially drivable by said support wheels and coacting with said cross sealers to separate said film pockets longitudinally between the pair of adjacent cross seals.

References Cited by the Examiner

UNITED STATES PATENTS

| | | | |
|---|---|---|---|
| 2,655,777 | 10/53 | Hagen | 53—66 X |
| 2,959,901 | 11/60 | Conti | 53—182 X |
| 3,075,328 | 1/63 | Willbrandt | 53—51 |

FRANK E. BAILEY, *Primary Examiner.*

TRAVIS S. MCGEHEE, *Examiner.*